United States Patent
Kitai

(10) Patent No.: US 9,317,914 B2
(45) Date of Patent: Apr. 19, 2016

(54) IMAGE INSPECTING DEVICE, IMAGE FORMING SYSTEM, AND COMPUTER PROGRAM PRODUCT

(71) Applicant: Tadashi Kitai, Kanagawa (JP)

(72) Inventor: Tadashi Kitai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/660,227

(22) Filed: Mar. 17, 2015

(65) Prior Publication Data

US 2015/0269719 A1   Sep. 24, 2015

(30) Foreign Application Priority Data

Mar. 18, 2014   (JP) .................................. 2014-055632
Mar. 10, 2015   (JP) .................................. 2015-047723

(51) Int. Cl.
*H04N 1/04*   (2006.01)
*G06T 7/00*   (2006.01)

(52) U.S. Cl.
CPC ............... *G06T 7/0002* (2013.01); *H04N 1/04* (2013.01); *G06T 2207/10008* (2013.01)

(58) Field of Classification Search
CPC .................. G06T 7/0002; G06T 2207/10008; H04N 1/04
USPC ................................ 358/1.9, 1.13, 1.14, 1.15
See application file for complete search history.

(56) References Cited

U.S. PATENT DOCUMENTS

| | | | | |
|---|---|---|---|---|
| 5,949,901 A * | 9/1999 | Nichani | .................. | G06T 7/001 382/149 |
| 7,388,979 B2 * | 6/2008 | Sakai | ................. | G01N 21/9501 348/126 |
| 2005/0043903 A1 * | 2/2005 | Nara | ....................... | G06T 7/001 702/35 |
| 2005/0179910 A1 * | 8/2005 | Bartov | ............... | G01N 21/9501 356/503 |
| 2005/0232478 A1 * | 10/2005 | Onishi | .................. | G06T 7/0004 382/149 |
| 2014/0036290 A1 | 2/2014 | Miyagawa et al. | | |
| 2014/0079292 A1 | 3/2014 | Kaneko et al. | | |
| 2014/0079293 A1 | 3/2014 | Kitai et al. | | |
| 2014/0268207 A1 | 9/2014 | Fukase et al. | | |
| 2015/0063654 A1 | 3/2015 | Kitai | | |

FOREIGN PATENT DOCUMENTS

| | | |
|---|---|---|
| JP | 2005-205797 | 8/2005 |
| JP | 2014-074709 | 4/2014 |

\* cited by examiner

*Primary Examiner* — Houshang Safaipour
(74) *Attorney, Agent, or Firm* — Harness, Dickey & Pierce, P.L.C.

(57) ABSTRACT

An image inspecting device includes: an image inspection unit that inspects a read image obtained by reading an image formed by an image formation output, based on threshold information including one or more types of thresholds and a difference image indicating a difference between the read image and a reference image generated based on print data of the image formation output, and specifies a defect portion; and a screen information generation unit that generates and outputs threshold adjustment screen information including a threshold image indicating each value of the thresholds and an inspection result image indicating an inspection result of the defect portion, and threshold adjustment result screen information including a threshold image and a reinspection result image using adjusted threshold information; and a threshold information changing unit that changes the threshold information to the adjusted threshold information based on a threshold information change input.

9 Claims, 14 Drawing Sheets

MASTER IMAGE			READ IMAGE

FIG.8

| 4 | 1 | 4 | 5 | 9 | 7 | 7 | 3 | 6 | 4 | 1 | 26 | 27 |
|---|---|---|---|---|---|---|---|---|---|---|---|---|
| 8 | 2 | 4 | 7 | 8 | 1 | 5 | 7 | 5 | 24 | 64 | 21 | 27 |
| 1 | 6 | 15 | 24 | 34 | 24 | 46 | 12 | 43 | 24 | 54 | 43 | 28 |
| 0 | 2 | 13 | 25 | 23 | 65 | 43 | 45 | 54 | 42 | 34 | 34 | 34 |
| 5 | 3 | 14 | 18 | 56 | 24 | 45 | 46 | 46 | 26 | 34 | 54 | 25 |
| 7 | 5 | 17 | 17 | 48 | 25 | 34 | 45 | 45 | 42 | 42 | 24 | 24 |
| 7 | 9 | 19 | 17 | 16 | 15 | 14 | 13 | 15 | 4 | 6 | 2 | 8 |
| 5 | 6 | 9 | 4 | 4 | 4 | 4 | 1 | 2 | 2 | 4 | 3 | 7 |
| 4 | 6 | 7 | 6 | 3 | 9 | 2 | 4 | 3 | 64 | 24 | 24 | 75 |
| 14 | 58 | 6 | 5 | 2 | 7 | 2 | 54 | 35 | 37 | 57 | 24 | 42 |
| 36 | 65 | 4 | 4 | 6 | 4 | 6 | 24 | 24 | 45 | 54 | 24 | 34 |

| 0 | 0 | 0 | 0 | 0 | 0 | 0 | 0 | 0 | 0 | 0 | 1 | 1 |
|---|---|---|---|---|---|---|---|---|---|---|---|---|
| 0 | 0 | 0 | 0 | 0 | 0 | 0 | 0 | 0 | 1 | 1 | 1 | 1 |
| 0 | 0 | 1 | 1 | 1 | 1 | 1 | 1 | 1 | 1 | 1 | 1 | 1 |
| 0 | 0 | 1 | 1 | 1 | 1 | 1 | 1 | 1 | 1 | 1 | 1 | 1 |
| 0 | 0 | 1 | 1 | 1 | 1 | 1 | 1 | 1 | 1 | 1 | 1 | 1 |
| 0 | 0 | 1 | 1 | 1 | 1 | 1 | 1 | 1 | 1 | 1 | 1 | 1 |
| 0 | 0 | 1 | 1 | 1 | 1 | 1 | 1 | 0 | 0 | 0 | 0 | |
| 0 | 0 | 0 | 0 | 0 | 0 | 0 | 0 | 0 | 0 | 0 | 0 | |
| 0 | 0 | 0 | 0 | 0 | 0 | 0 | 0 | 1 | 1 | 1 | 1 | |
| 1 | 1 | 0 | 0 | 0 | 0 | 0 | 1 | 1 | 1 | 1 | 1 | |
| 1 | 1 | 0 | 0 | 0 | 0 | 0 | 1 | 1 | 1 | 1 | 1 | |

| | | | | | | | | | | | |
|---|---|---|---|---|---|---|---|---|---|---|---|
| - | - | - | - | - | - | - | - | - | - | $H_{001}$ | $H_{001}$ |
| - | - | - | - | - | - | - | - | - | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | - | - | - | - |
| - | - | - | - | - | - | - | - | - | - | - | - |
| - | - | - | - | - | - | - | - | $H_{002}$ | $H_{002}$ | $H_{002}$ | $H_{002}$ |
| $H_{003}$ | $H_{003}$ | - | - | - | - | - | $H_{002}$ | $H_{002}$ | $H_{002}$ | $H_{002}$ | $H_{002}$ | $H_{002}$ |
| $H_{003}$ | $H_{003}$ | - | - | - | - | - | $H_{002}$ | $H_{002}$ | $H_{002}$ | $H_{002}$ | $H_{002}$ | $H_{002}$ |

| | | | | | | | | | | | |
|---|---|---|---|---|---|---|---|---|---|---|---|
| - | - | - | - | - | - | - | - | - | - | $H_{001}$ | $H_{001}$ |
| - | - | - | - | - | - | - | - | - | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | $H_{001}$ | $H_{001}$ | $H_{001}$ |
| - | - | $H_{001}$ | $H_{001}$ | $H_{001}$ | $H_{001}$ | $H_{001}$ | $H_{001}$ | $H_{001}$ | - | - | - | - |
| - | - | - | - | - | - | - | - | - | - | - | - |
| - | - | - | - | - | - | - | - | $H_{002}$ | $H_{002}$ | $H_{002}$ | $H_{002}$ |
| - | - | - | - | - | - | - | $H_{002}$ | $H_{002}$ | $H_{002}$ | $H_{002}$ | $H_{002}$ | $H_{002}$ |
| - | - | - | - | - | - | - | $H_{002}$ | $H_{002}$ | $H_{002}$ | $H_{002}$ | $H_{002}$ | $H_{002}$ |

| PAGE ID | MISREGIS-TRATION IN X-DIRECTION | MISREGIS-TRATION IN Y-DIRECTION | NUMBER OF DEFECT-OCCURRING PIXELS | NUMBER OF DEFECT CANDIDATE PIXELS | DEFECT DETERMINA-TION RESULT |
|---|---|---|---|---|---|
| Page001 | 5 | -1 | 0 | 64 | OK |
| Page002 | 4 | 0 | 0 | 0 | OK |
| Page003 | -1 | 2 | 33 | 54 | NG |
| ... | | | | | |

FIG.13

| DEFECT ID | DEFECT TYPE | DETERMINA-TION RESULT | DEFECT RANGE | AREA | DEFECT DETERMINA-TION VALUE |
|---|---|---|---|---|---|
| Def001 | DOT DEFECT | DEFECT | $X1_{001}, Y1_{001} - X2_{001}, Y2_{001}$ | 8 | 480 |
| Def002 | LINE DEFECT | CANDIDATE | $X1_{001}, Y1_{001} - X2_{001}, Y2_{001}$ | 26 | 380 |
| Def003 | PLANAR DEFECT | CANDIDATE | $X1_{001}, Y1_{001} - X2_{001}, Y2_{001}$ | 56 | 260 |
| ... | | | | | |

JOB ID
PAGE ID

DIFFERENCE IMAGE
READ IMAGE
MASTER IMAGE
...

| SET ID | NAME | REMARKS |
|---|---|---|
| set001 | STRICT | |
| set002 | STANDARD | |
| set003 | SLIGHTLY LOOSE | |
| set004 | LOOSE | |
| set005 | USER SETTING 1 | FOR MONOCHROME TEXT |
| set006 | USER SETTING 2 | FOR CATALOG PRINTING FOR MR. A |
| | | ... |

FIG.16

| ITEM ID | CONTENT | SET VALUE |
|---|---|---|
| item001 | PAGE DEFECT DETERMINATION THRESHOLD | 500 |
| item002 | DENSITY DIFFERENCE THRESHOLD OF DOT DEFECT | 20 |
| item003 | AREA THRESHOLD OF DOT DEFECT | 8 |
| item004 | DEFECT DETERMINATION COEFFICIENT OF DOT DEFECT | 5 |
| item005 | DENSITY DIFFERENCE THRESHOLD OF LINE DEFECT | 15 |
| item006 | AREA THRESHOLD OF LINE DEFECT | 20 |
| item007 | DEFECT DETERMINATION COEFFICIENT OF LINE DEFECT | 3 |
| item008 | DENSITY DIFFERENCE THRESHOLD OF PLANAR DEFECT | 10 |
| item009 | AREA THRESHOLD OF PLANAR DEFECT | 60 |
| item010 | DEFECT DETERMINATION COEFFICIENT OF PLANAR DEFECT | 1 |
| item011 | ASPECT RATIO FOR SWITCHING LINE DEFECT/PLANAR DEFECT | 10 |
| item012 | AREA FOR SWITCHING DOT DEFECT/PLANAR DEFECT | 12 |
| item013 | DENSITY DIFFERENCE THRESHOLD OF DOT DEFECT CANDIDATE | 10 |
| ... | | |

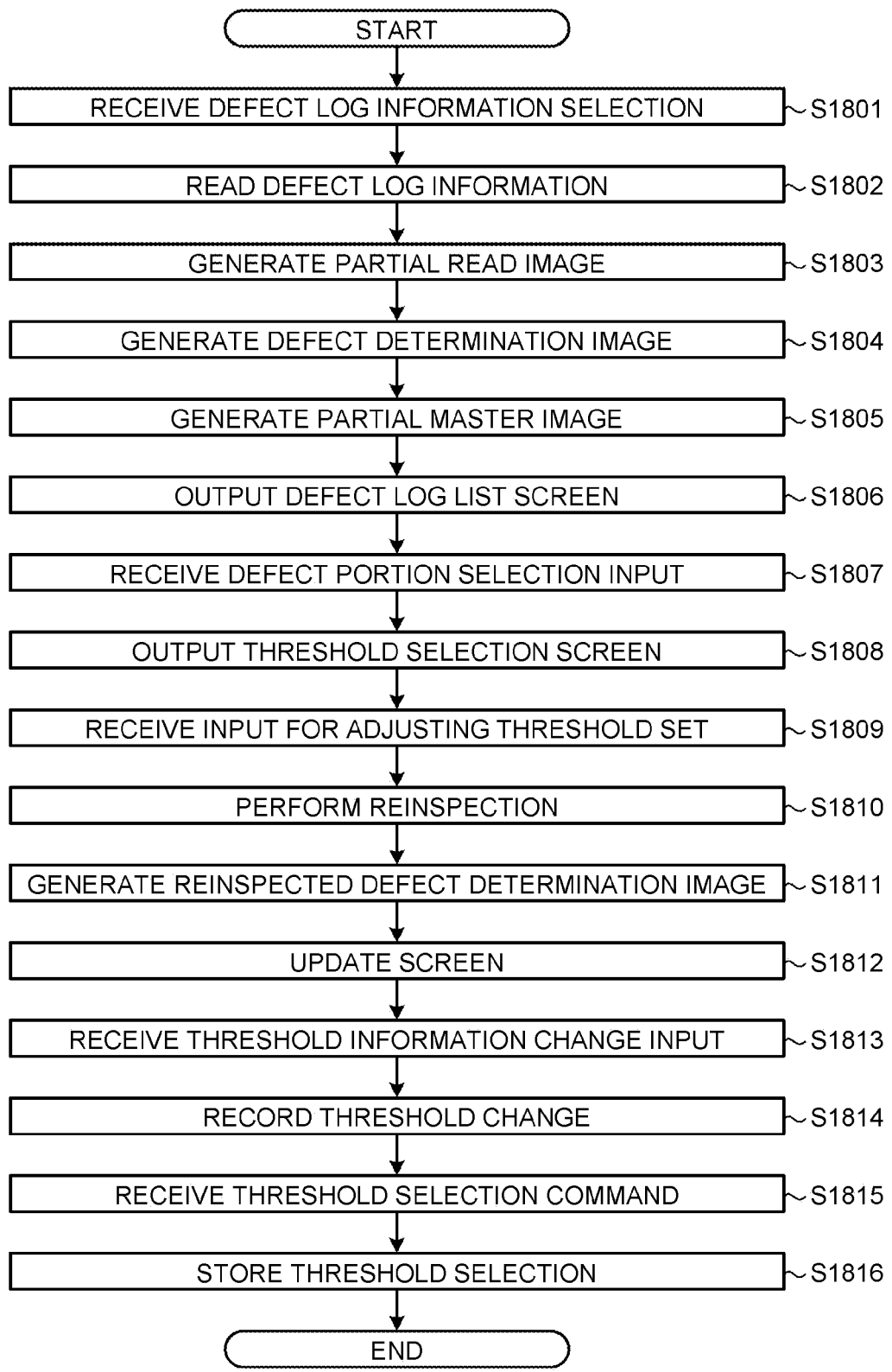

FIG.18

| SE-LECT | JOB ID | PAGE ID | DE-FECT ID | DEFECT DETERMINA-TION IMAGE | DE-FECT TYPE | DETER-MINA-TION RESULT | AREA | DEFECT DETER-MINATION VALUE |
|---|---|---|---|---|---|---|---|---|
| ☐ | 1 | 5 | 1 | | DOT DE-FECT | DE-FECT | 15 | 520 |
| ☐ | 1 | 5 | 2 | | LINE DE-FECT | CAN-DI-DATE | 26 | 400 |
| ☐ | 1 | 5 | 3 | | LINE DE-FECT | DE-FECT | 50 | 722 |
| ☐ | 1 | 12 | 1 | | PLA-NAR DE-FECT | DE-FECT | 80 | 811 |
| ☐ | 1 | 12 | 2 | | PLA-NAR DE-FECT | CAN-DI-DATE | 90 | 360 |

ADJUST INSPECTION THRESHOLD

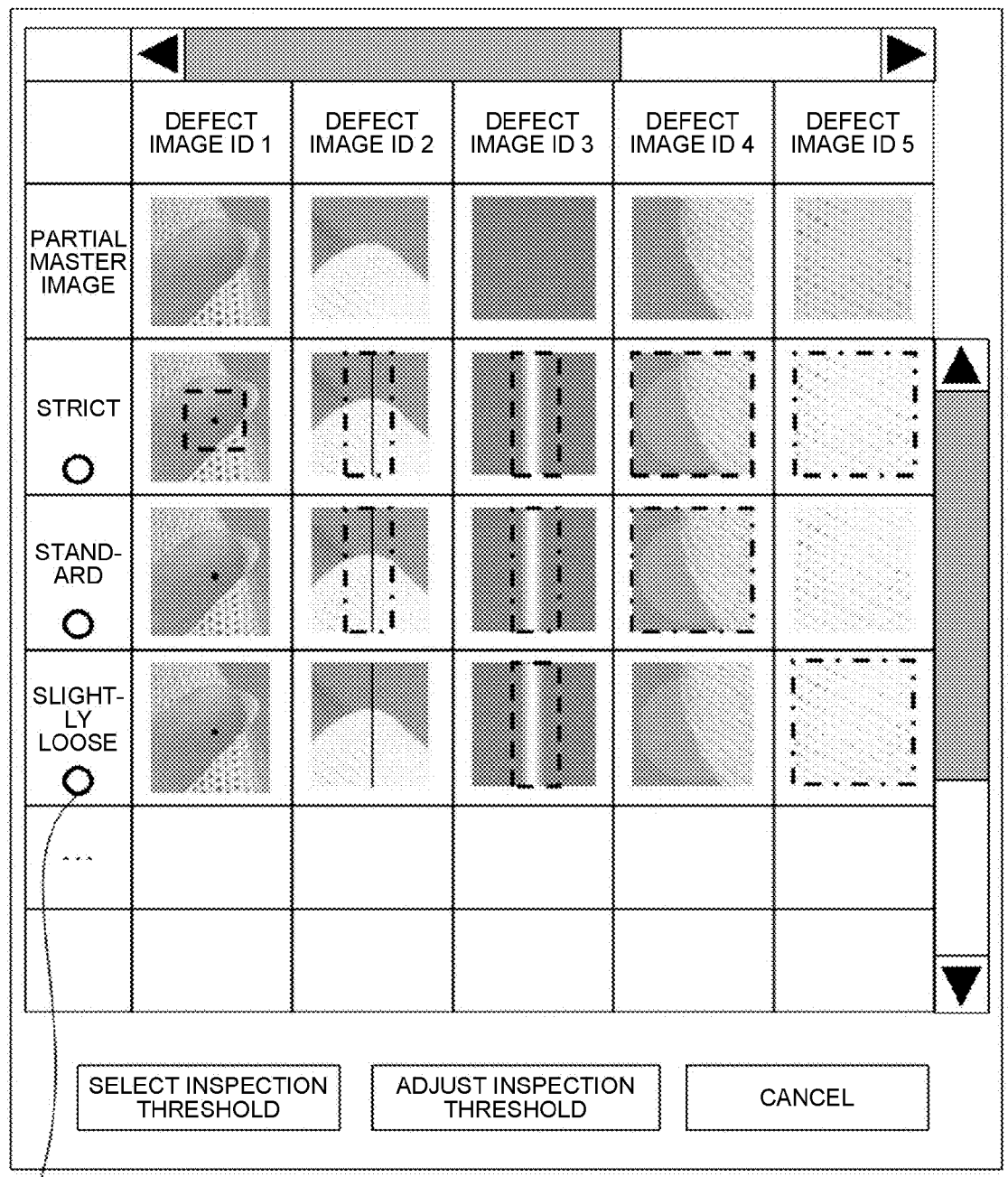

FIG.21

| DEFECT IMAGE ID 1 | DEFECT IMAGE ID 2 | DEFECT IMAGE ID 3 | DEFECT IMAGE ID 4 | DEFECT IMAGE ID 5 |
|---|---|---|---|---|

| THRESHOLD | CONTENT | SET VALUE |
|---|---|---|
| item002 | DENSITY DIFFERENCE THRESHOLD OF DOT DEFECT | 20 |
| item003 | AREA DIFFERENCE THRESHOLD OF DOT DEFECT | 8 |
| item005 | DENSITY DIFFERENCE THRESHOLD OF LINE DEFECT | 15 |
| item006 | AREA DIFFERENCE THRESHOLD OF LINE DEFECT | 20 |

CHANGE INSPECTION THRESHOLD | FINISH INSPECTION THRESHOLD SETTING | CANCEL

IMAGE INSPECTING DEVICE, IMAGE FORMING SYSTEM, AND COMPUTER PROGRAM PRODUCT

CROSS-REFERENCE TO RELATED APPLICATIONS

The present application claims priority to and incorporates by reference the entire contents of Japanese Patent Application No. 2014-055632 filed in Japan on Mar. 18, 2014 and Japanese Patent Application No. 2015-047723 filed in Japan on Mar. 10, 2015.

BACKGROUND OF THE INVENTION

1. Field of the Invention

The present invention relates to an image inspecting device, an image forming system, and a computer program product.

2. Description of the Related Art

Printed matter has been manually inspected in the related art. Alternatively, in recent years, devices for making an inspection as postprocessing of offset printing have been used. Such devices generate a master image as a reference by manually selecting a non-defective image from among read images of the printed matter to be electronically read, compares a portion of the master image with a corresponding portion of the read image of the printed matter to be inspected, and determines a defect of the printed matter based on a difference degree therebetween.

On the other hand, plateless printing devices such as of electrophotography that have been widely used in recent years are suitable for printing a small number of copies. There are many cases in which printing content varies from page to page such as variable data printing. Accordingly, it is inefficient for plateless printing devices to generate the master image from the printed matter to be compared unlike offset printers. To address this problem, it is considered to generate the master image from print data. In this manner, the variable data printing can be efficiently performed.

In inspection processing on such an image, whether the printed matter has a defect is determined by setting a certain threshold of the difference degree described above. The difference degree is a result obtained by aligning positions and equalizing sizes of the read image and the master image generated from the print data, and comparing both images with each other for each pixel.

To cause a determination result of the defect to be closer to a result intended by a user, a certain threshold described above needs to be set as intended by the user. As a technique related to a change of the threshold by the user, for example, developed is a technique of recalculating and displaying the number of images, when the threshold is changed, in a quality class corresponding to the changed threshold (for example, refer to Japanese Patent Application Laid-open No. 2005-205797).

By utilizing the technique disclosed in Japanese Patent Application Laid-open No. 2005-205797, when the threshold is changed, a change in the number of images included in each quality class can be checked. However, a change in the difference degree of the image that is determined as a defect cannot be checked, so that the threshold intended by the user can hardly be set.

In view of such a situation, there is a need to provide an image inspecting device, an image forming system, and a computer program product that can easily change the threshold used for inspecting the image to a value intended by the user.

SUMMARY OF THE INVENTION

It is an object of the present invention to at least partially solve the problems in the conventional technology.

An image inspecting device includes: a read image acquisition unit that acquires a read image obtained by reading an image formed by an image formation output; a reference image generation unit that generates a reference image based on print data, the print data being a generation source of the image formed by the image formation output; an image inspection unit that inspects the read image based on threshold information including one or more types of thresholds and a difference image indicating a difference between the read image and the reference image, and specifies a defect portion on the read image; and a screen information generation unit that generates and outputs threshold adjustment screen information including a threshold image indicating each value of the one or more types of thresholds constituting the threshold information and an inspection result image indicating an inspection result of a partial read image of the defect portion on the read image. When an adjustment input of the threshold information is performed for adjusting at least one value of the one or more types of thresholds, the image inspection unit reinspects the partial read image based on adjusted threshold information and a partial difference image indicating a difference between a partial read image of the defect portion on the read image and a partial reference image of a portion corresponding to the defect portion on the reference image. The screen information generation unit generates and outputs threshold adjustment result screen information including a threshold image indicating each value of the one or more types of thresholds constituting the adjusted threshold information and a reinspection result image indicating a reinspection result of the partial read image using the adjusted threshold information. The image inspecting device further includes a threshold information changing unit that changes the threshold information to the adjusted threshold information based on a threshold information change input for changing the threshold information to the adjusted threshold information.

An image forming system includes: an image forming unit that performs an image formation output on a recording medium; an image reading unit that generates a read image by reading an image formed on the recording medium; a read image acquisition unit that acquires the read image; a reference image generation unit that generates a reference image based on print data, the print data being a generation source of the image formed on the recording medium; an image inspection unit that inspects the read image based on threshold information including one or more types of thresholds and a difference image indicating a difference between the read image and the reference image to specify a defect portion on the read image; and a screen information generation unit that generates and outputs threshold adjustment screen information including a threshold image indicating each value of the one or more types of thresholds constituting the threshold information and an inspection result image indicating an inspection result of a partial read image of the defect portion on the read image. When an adjustment input of the threshold information is performed for adjusting at least one of the one or more types of thresholds, the image inspection unit reinspects the partial read image based on adjusted threshold information and a partial difference image indicating a difference between a partial read image of the defect portion on the read image and a partial reference image of a portion corresponding to the defect portion on the reference image. The screen information generation unit generates and outputs threshold adjustment result screen information including a threshold image indicating each value of the one or more types of thresholds constituting the adjusted threshold information and a reinspection result image indicating a reinspection result of the partial read image using the adjusted threshold information. The image forming system further comprises a threshold information changing unit that changes the threshold information to the adjusted threshold information based on a threshold information change input for changing the threshold information to the adjusted threshold information.

A computer program product includes a non-transitory computer-readable medium containing an information processing program. The program causes a computer to perform: acquiring a read image obtained by reading an image formed by an image formation output; generating a reference image based on print data, the print data being a generation source of the image formed by the image formation output; inspecting the read image based on threshold information including one or more types of thresholds and a difference image indicating a difference between the read image and the reference image, to specify a defect portion on the read image; generating and outputting threshold adjustment screen information including a threshold image indicating each value of the one or more types of thresholds constituting the threshold information and an inspection result image indicating an inspection result of a partial read image of the defect portion on the read image; when an adjustment input of the threshold information is performed for adjusting at least one value of the one or more types of thresholds, reinspecting the partial read image based on adjusted threshold information and a partial difference image indicating a difference between a partial read image of the defect portion on the read image and a partial reference image of a portion corresponding to the defect portion on the reference image; generating and outputting threshold adjustment result screen information including a threshold image indicating each value of the one or more types of thresholds constituting the adjusted threshold information and a reinspection result image indicating a reinspection result of the partial read image using the adjusted threshold information; and changing the threshold information to the adjusted threshold information based on a threshold information change input for changing the threshold information to the adjusted threshold information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a diagram illustrating an example of a difference image according to the embodiment;

FIG. 9 is a diagram illustrating an example of a threshold-determined difference image according to the embodiment;

FIG. 10 is a diagram illustrating an example of a labeled difference image according to the embodiment;

FIG. 11 is a diagram illustrating an example of an image for identifying a defect occurring part according to the embodiment;

FIG. 12 is a diagram illustrating an example of page determination log information according to the embodiment;

FIG. 13 is a diagram illustrating an example of defect log information according to the embodiment;

FIG. 16 is a diagram illustrating an example of thresholds included in the threshold set according to the embodiment;

FIG. 17 is a flowchart illustrating a threshold setting operation according to the embodiment;

FIG. 18 is a diagram illustrating an example of a defect log list screen according to the embodiment;

FIG. 20 is a diagram illustrating an example of the threshold selection screen according to the embodiment; and FIG. 21 is a diagram illustrating an example of a threshold adjustment screen according to the embodiment.

DETAILED DESCRIPTION OF THE PREFERRED EMBODIMENTS

The following describes an embodiment of the present invention in detail with reference to the drawings. The embodiment describes a function for facilitating a setting of a threshold applied to a difference value between a read image and a master image in an image inspecting system including an image inspecting device that inspects an output result by comparing the read image obtained by reading the output result of an image formation output with the master image (an example of a reference image).

Figure 1:
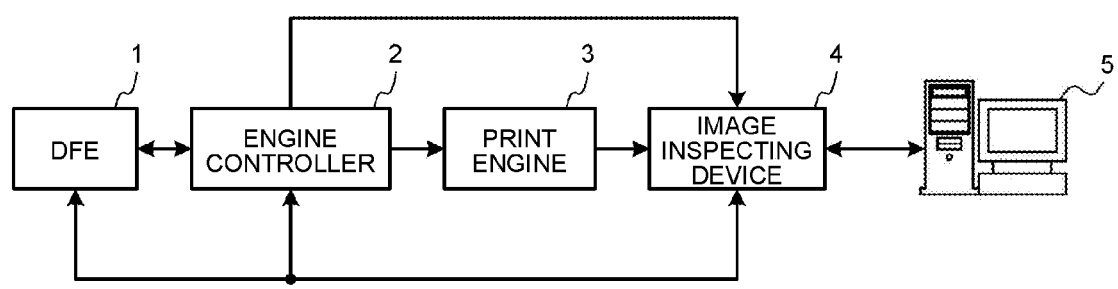
FIG. 1 is a diagram illustrating a configuration of an image forming system including an image inspecting device according to an embodiment.

FIG. 1 is a diagram illustrating the entire structure of an image forming system according to the embodiment. As illustrated in FIG. 1, the image forming system according to the embodiment includes a digital front end (DFE) 1, an engine controller 2, a print engine 3, an image inspecting device 4, and an interface terminal 5. The DFE 1 is an image processing device that generates, based on a received print job, print data to be printed and output, specifically, bit map data as an image to be output, and outputs the generated bit map data to the engine controller 2.

The engine controller 2 controls the print engine 3 to execute the image formation output based on the bit map data received from the DFE 1. The engine controller 2 transmits the bit map data received from the DFE 1 to the inspecting device 4 as information to be a source of the master image that is referenced by the image inspecting device 4 in inspecting a result of the image formation output by the print engine 3.

The print engine 3 is an image forming apparatus that executes the image formation output on a print sheet serving as a recording medium based on the bit map data under control by the engine controller 2. The recording medium may be any sheet material such as a film and plastics that is able to be a target of the image formation output, in addition to the print sheet described above.

The image inspecting device 4 generates the master image based on the bit map data input from the engine controller 2. The image inspecting device 4 compares a read image generated by reading the sheet output from the print engine 3 using a reading device with the generated master image to inspect an output result.

If it is determined that the output result includes a defect, the image inspecting device 4 notifies the engine controller 2 of information indicating a page determined as the defect. Accordingly, the engine controller 2 executes reprinting control of a defect page.

The interface terminal 5 is an information processing terminal for displaying a graphical user interface (GUI) to check an inspection result of the image inspecting device 4 or a GUI for setting a parameter in the inspection, and is implemented with a common information processing terminal such as a personal computer (PC). A threshold setting function according to the embodiment is implemented via the interface terminal 5.

Figure 2:
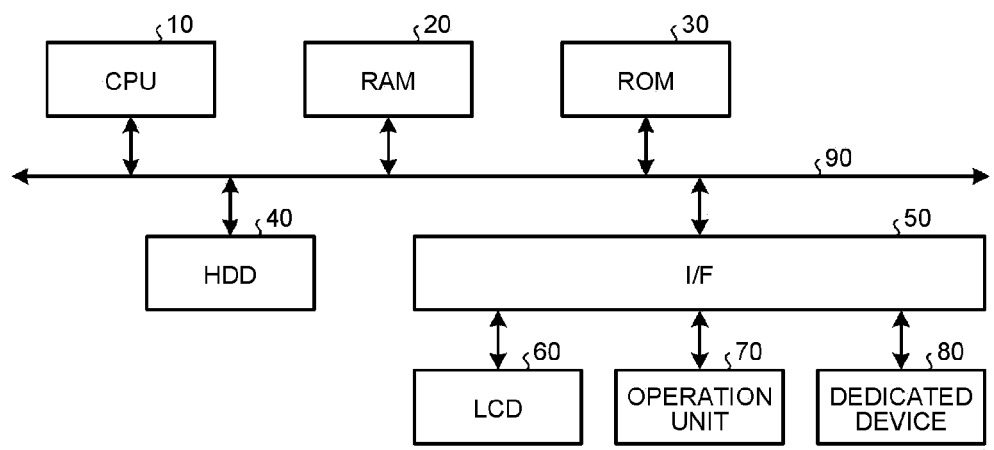
FIG. 2 is a block diagram illustrating a hardware configuration of the image inspecting device according to the embodiment.

The following describes hardware that implements each of the DFE 1, the engine controller 2, the print engine 3, the image inspecting device 4, and the interface terminal 5 according to the embodiment with reference to FIG. 2. FIG. 2 is a block diagram illustrating a hardware configuration of the image inspecting device 4 according to the embodiment. Although FIG. 2 illustrates the hardware configuration of the image inspecting device 4, the same applies to the other devices.

As illustrated in FIG. 2, the image inspecting device 4 according to the embodiment has the same configuration as that of an information processing device such as a common personal computer (PC) and a server. That is, in the image inspecting device 4 according to the embodiment, a central processing unit (CPU) 10, a random access memory (RAM) 20, a read only memory (ROM) 30, a hard disk drive (HDD) 40, and an I/F 50 are connected to each other via a bus 90. A liquid crystal display (LCD) 60, an operation unit 70, and a dedicated device 80 are connected to the I/F 50.

The CPU 10 is a computing module that controls the entire operation of the image inspecting device 4. The RAM 20 is a volatile storage medium that can read and write information at high speed, and is used as a working area when the CPU 10 processes the information. The ROM 30 is a read-only non-volatile storage medium and stores a computer program such as firmware. The HDD 40 is a non-volatile storage medium that can read and write information, and stores an operating system (OS), various control programs, application programs, and/or the like.

The I/F 50 connects the bus 90 with various hardware, a network, and/or the like to control them. The LCD 60 is a visual user interface for a user to check the state of the image inspecting device 4. The operation unit 70 is a user interface such as a keyboard or a mouse through which the user inputs information to the image inspecting device 4.

The dedicated device 80 is hardware for implementing dedicated functions for the engine controller 2, the print engine 3, and the image inspecting device 4. In a case of the print engine 3, the dedicated device 80 is a conveying mechanism for conveying a sheet on which the image formation output is executed, or a plotter device that executes the image formation output on a sheet surface. In cases of the engine controller 2 and the image inspecting device 4, the dedicated device 80 is a dedicated arithmetic unit for performing image processing at high speed. Such an arithmetic unit is implemented as an application specific integrated circuit (ASIC), for example. The dedicated device 80 also implements a reading device that reads an image output onto the sheet surface.

In such a hardware configuration, a software control unit is implemented such that the CPU 10 performs calculation according to a computer program stored in the ROM 30 or a computer program loaded into the RAM 20 from a recording medium such as the HDD 40 or an optical disc (not illustrated). The combinations of the hardware and the software control units implemented as described above implement functional blocks that implement functions of the DFE 1, the engine controller 2, the print engine 3, the inspecting device 4, and the interface terminal 5 according to the embodiment.

Figure 3:
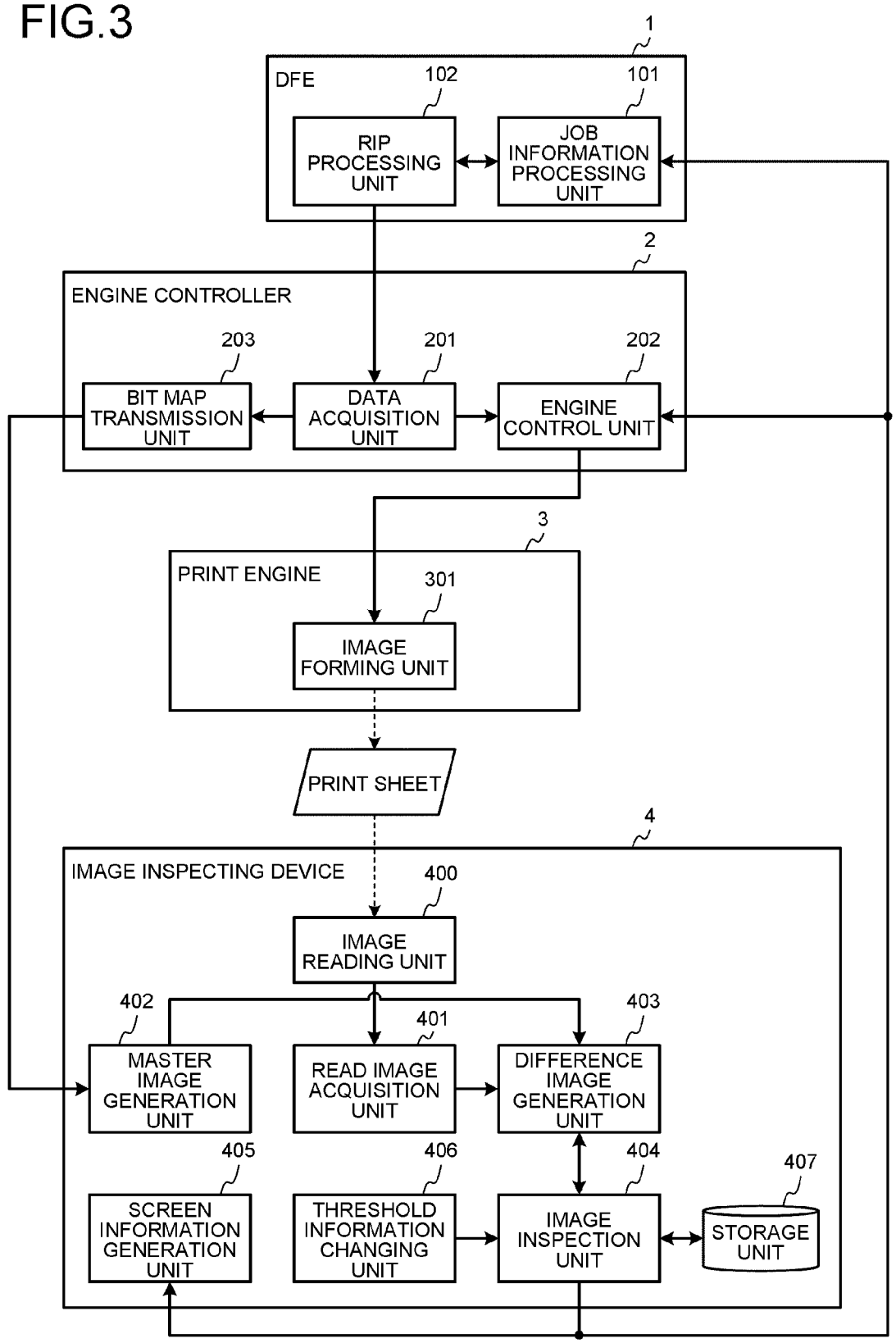
FIG. 3 is a block diagram illustrating a functional configuration of a DFE, an engine controller, a print engine, and the image inspecting device according to the embodiment.

FIG. 3 is a block diagram illustrating a functional configuration of the DFE 1, the engine controller 2, the print engine 3, and the image inspecting device 4 according to the embodiment. In FIG. 3, the solid line indicates transmission/reception of data, and the dashed line indicates a flow of the sheet. As illustrated in FIG. 3, the DFE 1 according to the embodiment includes a job information processing unit 101 and an RIP processing unit 102. The engine controller 2 includes a data acquisition unit 201, an engine control unit 202, and a bit map transmission unit 203. The print engine 3 includes an image forming unit 301. The image inspecting device 4 includes an image reading unit 400, a read image acquisition unit 401, a master image generation unit 402 (an example of a reference image generation unit), a difference image generation unit 403, an image inspection unit 404, a screen information generation unit 405, a threshold information changing unit 406, and a storage unit 407.

The job information processing unit 101 controls execution of the image formation output based on a print job input from the outside of the DFE 1 via a network or a print job generated by an operator's operation based on image data stored in the DFE 1. In executing the image formation output, the job information processing unit 101 causes the RIP processing unit 102 to generate the bit map data based on the image data included in the print job.

According to the control by the job information processing unit 101, the RIP processing unit 102 generates the bit map data for the print engine 3 to execute the image formation output based on the image data included in the print job. The bit map data is information about each pixel constituting an image that is formed by the image formation output.

The print engine 3 according to the embodiment executes the image formation output based on a binary image of each color of cyan, magenta, yellow, and black (CMYK). In contrast, the image data included in the print job is commonly a multi-level image in which each pixel is represented in multi-gradation such as 256 gradations. Due to this, the RIP processing unit 102 converts the image data included in the print job from the multi-level image into a smaller-number-of-level image to generate binary bit map data of each color of CMYK, and transmits the bit map data to the engine controller 2.

The data acquisition unit 201 acquires the bit map data input from the DFE 1, and causes each of the engine control unit 202 and the bit map transmission unit 203 to operate. The engine control unit 202 causes the print engine 3 to execute the image formation output based on the bit map data transferred from the data acquisition unit 201. The bit map transmission unit 203 transmits the bit map data acquired by the data acquisition unit 201 to the image inspecting device 4 to generate the master image.

The image forming unit 301 acquires the bit map data input from the engine controller 2, executes the image formation output on the print sheet, and outputs a printed sheet. The image forming unit 301 according to the embodiment is implemented with a common electrophotographic type image forming mechanism. Alternatively, another image forming mechanism such as an inkjet type can be used.

The image reading unit 400 reads the image formed on the surface of the output print sheet on which the image forming unit 301 has performed printing, and generates and outputs the read image. The image reading unit 400 is, for example, a line scanner arranged on a conveyance path through which the print sheet output from the image forming unit 301 is conveyed in the image inspecting device 4, and reads the image formed on the sheet surface by scanning the surface of the print sheet to be conveyed.

The image inspecting device 4 inspects the read image generated by the image reading unit 400. The read image is generated by reading the surface of the sheet output by the image formation output, so that the read image indicates an output result. The read image acquisition unit 401 acquires the read image generated by the image reading unit 400 by reading the surface of the print sheet. The read image acquired by the read image acquisition unit 401 is input to the difference image generation unit 403.

As described above, the master image generation unit 402 acquires the bit map data input from the engine controller 2 and generates the master image. Processing for generating the master image performed by the master image generation unit 402 will be described later in detail.

The difference image generation unit 403 compares the read image input from the read image acquisition unit 401 with the master image generated by the master image generation unit 402, and generates a difference image indicating a difference between the read image and the master image. The difference image generation unit 403 is implemented with the ASIC described above to promptly process a huge amount of calculation.

The difference image generation unit 403 compares the master image with the read image of 200 dpi represented by 8 bits for each color of RGB and for each pair of corresponding pixels as described above, and calculates a difference value between pixel values of 8 bits for each color of RGB described above. The difference image is an image consisting of the difference values of the image.

The image inspection unit 404 inspects the read image based on a threshold set (an example of threshold information) and the difference image, and specifies one or more defect portions on the read image. The threshold set is a threshold set that has been enabled among a plurality of threshold sets (an example of a plurality of pieces of threshold information). The threshold set includes one or more types of thresholds, and values of one or more types of thresholds included in the threshold set are different in every threshold set. Examples of the one or more types of thresholds include a density difference threshold, an area threshold, and a page defect determination threshold. Details about each threshold will be described later. In comparing the read image with the master image, as illustrated in FIG. 4, the difference image generation unit 403 overlaps a certain range of the divided master image with the read image corresponding to the divided range to calculate a difference between pixel values, that is, densities of the pixels.

The difference image generation unit 403 vertically and horizontally shifts the position where the divided range is overlapped with the read image, that is, vertically and horizontally shifts the range of the image acquired from the read image, and determines the position where a total value of calculated difference values is the smallest as an accurate overlapping position. The calculated difference value of each pixel is employed as a comparison result. Accordingly, the difference image generation unit 403 can output vertical and horizontal shift amounts when an alignment position is determined together with the difference value of each pixel.

Figure 4:
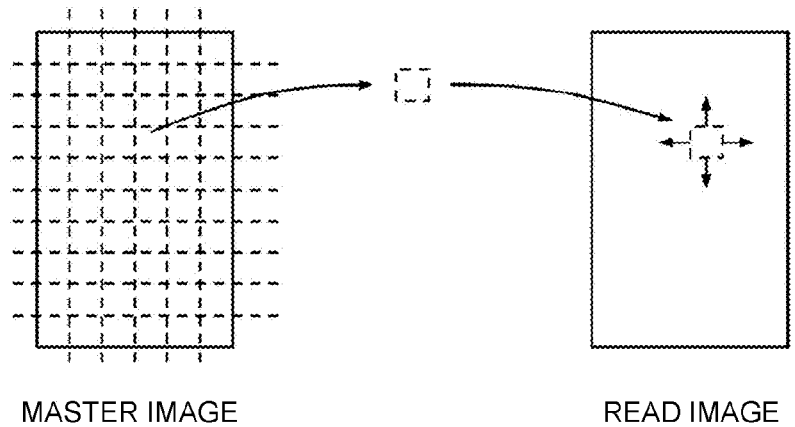
FIG. 4 is a diagram illustrating an aspect of comparison inspection according to the embodiment.

Each of cells divided in a grid pattern as illustrated in FIG. 4 is a certain range in which the difference values of the pixels described above are totaled. For example, a size of each division range illustrated in FIG. 4 is determined based on a range in which the difference image generation unit 403 implemented with the ASIC as described above can compare the pixel values at a time.

With such processing, the difference value is calculated while the read image is aligned with the master image. The thus calculated difference value is compared with a certain threshold to determine a defect of the image. For example, even if a scale is different between the entire read image and the entire master image, influence from the difference in the scale can be reduced by dividing each range to be aligned as illustrated in FIG. 4.

In the divided ranges illustrated in FIG. 4, misregistration amounts of adjacent ranges are estimated to be relatively close to each other. In performing comparison inspection on each of the divided ranges, by vertically and horizontally shifting the position centering on the misregistration amount determined through the comparison inspection of adjacent regions to perform calculation, even when the number of times of calculation while vertically and horizontally shifting the position is reduced, the calculation is performed at the accurate overlapping position with high possibility, which can reduce the whole calculation amount.

The screen information generation unit 405 according to the embodiment has a function of providing a graphical user interface (GUI) for easily setting the threshold to be compared with the difference value calculated as described above. Details about the difference image generation unit 403, the image inspection unit 404, the screen information generation unit 405, the threshold information changing unit 406, and the storage unit 407 for implementing the above function will be described later.

Figure 5:
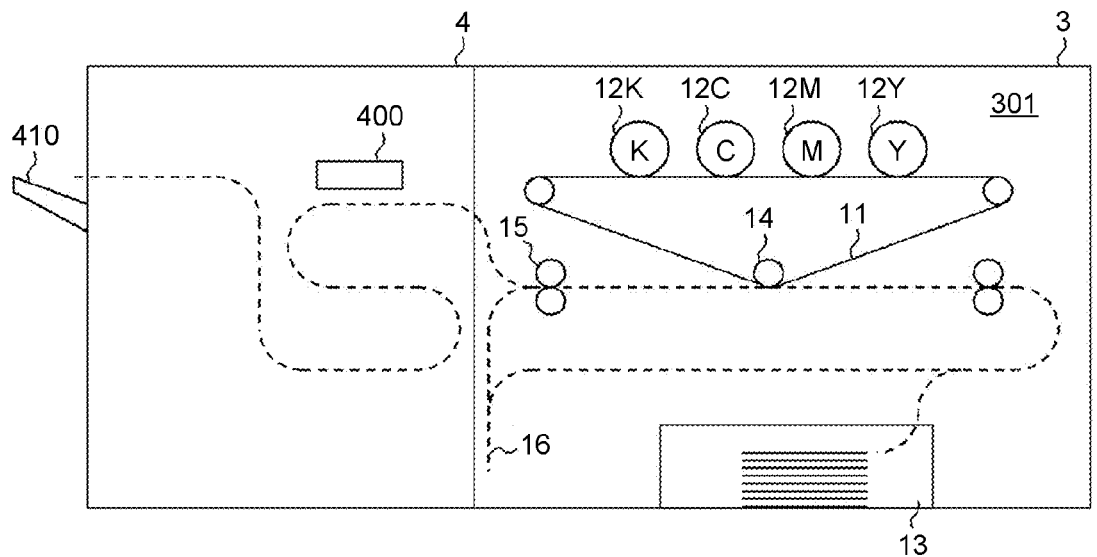
FIG. 5 is a diagram illustrating a configuration of the print engine according to the embodiment.

Next, the following describes a mechanical configuration of the print engine 3 and the image inspecting device 4, and the conveyance path of the sheet with reference to FIG. 5. As illustrated in FIG. 5, the image forming unit 301 included in the print engine 3 according to the embodiment has a configuration in which photoconductor drums of respective colors 12Y, 12M, 12C, and 12K (hereinafter, collectively referred to as a photoconductor drum 12) are arranged along a conveyance belt 11 serving as an endless moving module, and is what is called a tandem type. That is, along the conveyance belt 11 serving as an intermediate transfer belt on which an intermediate transfer image to be transferred onto the sheet (an example of the recording medium) fed from a sheet feeding tray 13 is formed, the photoconductor drums 12Y, 12M, 12C, and 12K are arrayed in this order from the upstream of a conveying direction of the conveyance belt 11.

An image of each color developed with toner on the surface of the photoconductor drum 12 of each color is overlapped with the conveyance belt 11 to be transferred, and a full-color image is formed. The full-color image thus formed on the conveyance belt 11 is transferred onto the surface of the sheet conveyed through the path by a function of a transfer roller 14 at a position closest to the conveyance path of the sheet indicated by the dashed line in the drawing.

The sheet on which the image is formed is further conveyed, the image is fixed thereto by a fixing roller 15, and the sheet is conveyed to the image inspecting device 4. In a case of double-side printing, the sheet on which the image is formed and fixed on one side is conveyed to a reverse path 16, and reversed and conveyed to a transfer position of the transfer roller 14 again.

The image reading unit 400 reads each side of the sheet conveyed from the image forming unit 301 in the conveyance path of the sheet in the image inspecting device 4 to generate the read image, and outputs the read image to the read image acquisition unit 401 implemented with an information processing device in the image inspecting device 4. The sheet the surface of which is read by the image reading unit 400 is further conveyed in the image inspecting device 4 to be discharged to a paper discharge tray 410. In the example of FIG. 5, the image reading unit 400 is arranged on only one side of the sheet in the conveyance path of the sheet in the image inspecting device 4. Alternatively, the image reading unit 400 may be arranged on each of both sides of the sheet to enable inspection of both sides of the sheet.

Figure 6:
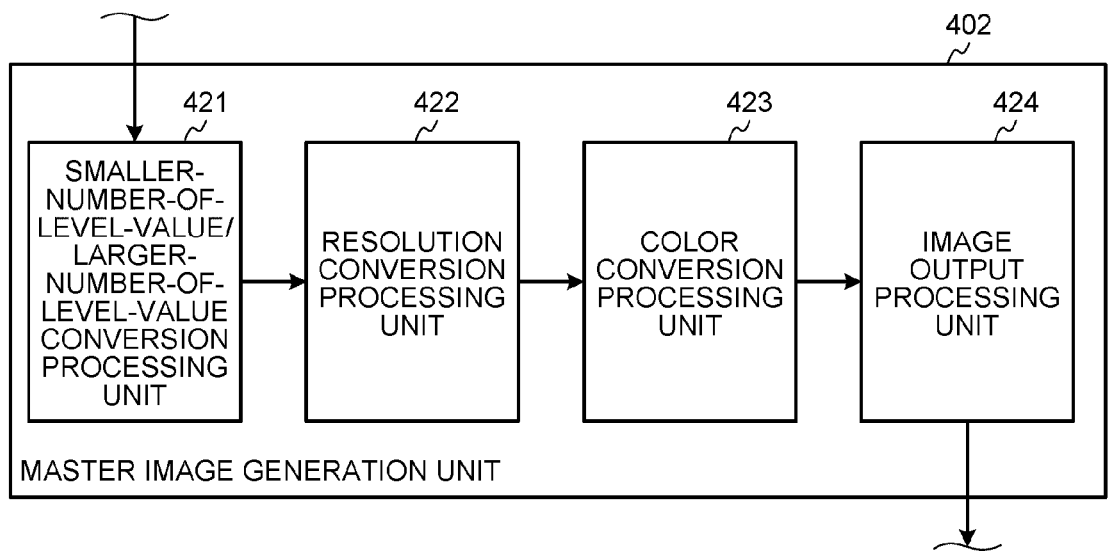
FIG. 6 is a block diagram illustrating a functional configuration of a master image generation unit according to the embodiment.

Next, the following describes a functional configuration of the master image generation unit 402 according to the embodiment. FIG. 6 is a block diagram illustrating an internal configuration of the master image generation unit 402. As illustrated in FIG. 6, the master image generation unit 402 includes a smaller-number-of-level-value/larger-number-of-level-value conversion processing unit 421, a resolution conversion processing unit 422, a color conversion processing unit 423, and an image output processing unit 424. The master image generation unit 402 according to the embodiment is implemented by the dedicated device 80 illustrated in FIG. 2, that is, the hardware implemented as the ASIC operating under control of the software.

The smaller-number-of-level-value/larger-number-of-level-value conversion processing unit 421 performs smaller-number-of-level-value/larger-number-of-level-value conversion processing on a colored/colorless binary image to generate the multi-level image. The bit map data according to the embodiment is information to be input to the print engine 3. The print engine executes the image formation output based on the binary image of each color of cyan, magenta, yellow, and black (CMYK). In contrast, the read image to be inspected is a multi-level image in multi-gradation of each color of red, green, and blue (RGB), which is basic three primary colors, so that the smaller-number-of-level-value/larger-number-of-level-value conversion processing unit 421 first converts the binary image into the multi-level image. As the multi-level image, for example, an image represented with 8 bits of each color of CMYK may be used.

The smaller-number-of-level-value/larger-number-of-level-value conversion processing unit 421 performs 8-bit extension processing and smoothing processing as the smaller-number-of-level-value/larger-number-of-level-value conversion processing. The 8-bit extension processing is processing for causing 1-bit data 0/1 to be 8-bit data, that is, converting "1" into "255" while keeping "0" as it is. The smoothing processing is processing for applying a smoothing filter to the 8-bit data to smooth the image.

In the embodiment, as merely an example, the print engine 3 executes the image formation output based on the binary image of each color of CMYK, and the smaller-number-of-level-value/larger-number-of-level-value conversion processing unit 421 is included in the master image generation unit 402. That is, when the print engine 3 executes the image formation output based on the multi-level image, the smaller-number-of-level-value/larger-number-of-level-value conversion processing unit 421 is not required.

Alternatively, the print engine 3 may have a function of executing the image formation output based on a smaller-number-of-level image such as a 2-bit image, not the 1-bit image. To address this case, a function of 8-bit extension processing may be changed. That is, in a case of 2-bit, gradation values are four values of 0, 1, 2, and 3. Accordingly, in the 8-bit extension, "0" is not changed, "1" is converted into "85", "2" is converted into "170", and "3" is converted into "255".

The resolution conversion processing unit 422 performs resolution conversion so that resolution of the multi-level image generated by the smaller-number-of-level-value/larger-number-of-level-value conversion processing unit 421 is matched with the resolution of the read image to be inspected. In the embodiment, the image reading unit 400 generates the read image of 200 dpi, so that the resolution conversion processing unit 422 converts the resolution of the multi-level image generated by the smaller-number-of-level-value/larger-number-of-level-value conversion processing unit 421 into 200 dpi. In the resolution conversion, the resolution conversion processing unit 422 according to the embodiment adjusts a size of the image after the resolution conversion based on a magnification determined in advance considering shrinkage and/or the like of the sheet output from the image forming unit 301.

The color conversion processing unit 423 acquires the image the resolution of which is converted by the resolution conversion processing unit 422, and converts the gradation and color expression form thereof. Gradation conversion processing is color tone conversion processing to match a color tone of the master image with a color tone of the image formed on the sheet surface by the image forming unit 301 to a color tone of the image read and generated by the image reading unit 400.

Such processing is performed, for example, using a gradation conversion table in which a gradation value of each color patch in the read image generated by reading the sheet on which an image including color patches of various gradation colors is formed by the image forming unit 301 is associated with a gradation value of an original image for forming each color patch. That is, the color conversion processing unit 423 converts the gradation value of each color of the image output from the resolution conversion processing unit 422 based on such a gradation conversion table.

The processing for converting the color expression form is processing for converting a CMYK format image into an RGB format image. As described above, the read image according to the embodiment is the RGB format image, so that the color conversion processing unit 423 converts the CMYK format image on which the gradation conversion processing is performed into the RGB format image. Accordingly, generated is the multi-level image of 200 dpi represented with 8 bits of each color of RGB (24 bits in total) for each pixel.

The image output processing unit 424 outputs the master image generated through the processing up to the color conversion processing unit 423. Accordingly, the difference image generation unit 403 acquires the master image from the master image generation unit 402.

Figure 7:
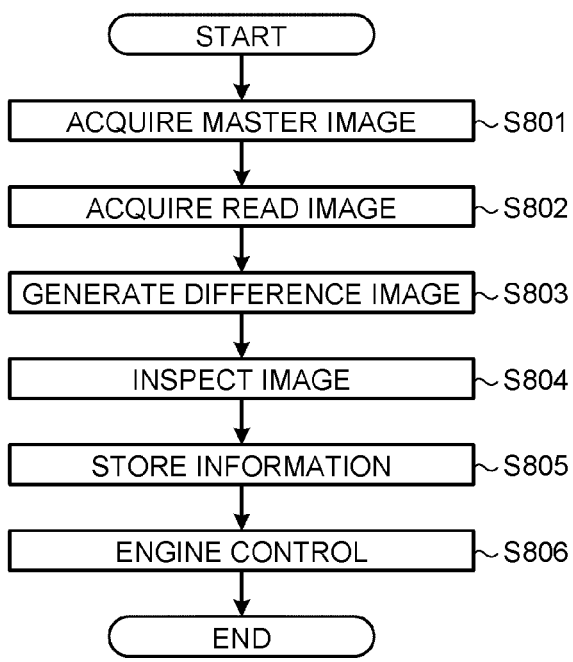
FIG. 7 is a flowchart illustrating an inspecting operation according to the embodiment.

Next, the following describes details about the difference image generation unit 403, the image inspection unit 404, the screen information generation unit 405, the threshold information changing unit 406, and the storage unit 407 according to the embodiment. FIG. 7 is a flowchart illustrating an operation of inspecting the image for one page according to the embodiment.

As illustrated in FIG. 7, first, the difference image generation unit 403 acquires the master image from the master image generation unit 402 (S801), and acquires the read image from the read image acquisition unit 401 (S802). The order of the processing at S801 and the processing at S802 is not limited, so that they may be performed in a reversed order, or may be performed in parallel.

Subsequently, the difference image generation unit 403 compares the master image with the read image to generate the difference image (S803).

Through the processing at S803, the difference image is generated indicating a difference value between each pixel constituting the read image and each pixel constituting the master image, and the image inspection unit 404 acquires the generated difference image. FIG. 8 is a diagram illustrating an example of the difference image according to the embodiment. As illustrated in FIG. 8, each pixel constituting the difference image is the difference value between the pixel constituting the read image and the pixel constituting the master image as described above. The image inspection unit 404 then inspects the image based on the acquired difference image (S804).

At S804, the image inspection unit 404 first compares a value of each pixel constituting the difference image, that is, the difference value with the density difference threshold included in the threshold set that has been enabled to determine a defect in pixel units. Through threshold determination with the density difference threshold, the threshold-determined difference image is generated, in which 1-bit value "0" or "1" indicates whether each pixel exceeds the threshold as illustrated in FIG. 9, based on the difference image illustrated in FIG. 8.

In the example of FIGS. 8 and 9, the density difference threshold is assumed to be "10", the pixel is determined to be "0" if the difference value of the pixel illustrated in FIG. 8 is smaller than "10", and the pixel is determined to be "1" if the difference value is equal to or larger than "10". The pixel being "1" in the threshold-determined difference image as illustrated in FIG. 9 is a pixel determined as a defect based on the density difference threshold.

The image inspection unit 404 focuses on the pixel having the value "1", that is, the pixel in which the difference value exceeds the threshold in the threshold-determined difference image illustrated in FIG. 9, and allocates the same label information to a plurality of pixels having the value "1" that are present in a certain range to cause a plurality of pixels to be one pixel group. This processing is called labeling processing.

A method of labeling processing may include, for example, performing expansion processing that converts the pixel having the value "0" around the pixel having the value "1" into "1", and adding the same label information to the pixels having the value "1" that are continuous in vertical, horizontal, and oblique directions. This method enables regions of the pixels having the value "1" that are very close to each other but are not continuous to be connected. The expansion processing for connecting the pixels of "1" that are close to each other but are not continuous is performed not only once, but may be repeated multiple times. Through the labeling processing, a labeled difference image as illustrated in FIG. 10 is generated.

The image inspection unit 404 focuses on the number of pixels in each pixel group, that is, an area of the labeled region in the labeled difference image as illustrated in FIG. 10, and compares the number of pixels in each pixel group with the area threshold included in the threshold set that has been enabled to determine a defect in pixel group units.

Accordingly, only pixel groups having the area equal to or larger than the area threshold are left, and the pixel groups are narrowed down as illustrated in FIG. 11. In the example of FIGS. 10 and 11, a pixel group to which the label information of "H003" is added is excluded as the pixel group that is smaller than the area threshold.

As illustrated in FIG. 11, information generated through the processing of area threshold determination becomes an image for identifying a defect occurring part indicating a portion determined as the defect. In the example of FIG. 11, the pixel groups to which pieces of the label information of "H001" and "H002" are added are determined as the defect.

The image inspection unit 404 performs the processing described above for each type of defect. Examples of the type of defect include a "dot defect", a "line defect", and a "planar defect". The above processing is performed for each defect to generate the image for identifying a defect occurring part illustrated in FIG. 11 for each defect.

The image inspection unit 404 extracts the difference values of the pixels indicated as the defect in the image for identifying a defect occurring part for each defect type from the acquired difference image illustrated in FIG. 8, sums values obtained by multiplying the difference values with a coefficient corresponding to the type of the defect, and calculates a defect determination value of the page.

The image inspection unit 404 compares the defect determination value for each page with the page defect determination threshold included in the threshold set that has been enabled to determine the defect in page units. Accordingly, it is determined whether each page has the defect, and the image inspection unit 404 obtains a defect determination result for each page and a defect determination result for each pixel group.

Such defect determination processing includes determination with a threshold for determining whether the information should be stored as a defect candidate although a defect level is lower than the level for determining the defect, in addition to the determination with the threshold for determining each page as the defect. The threshold for determining the defect candidate is a stricter value than the threshold for determining the defect. That is, even when a page is not determined as a defect, the page may be determined as a defect candidate. Through such processing, the information of the page that may be determined as the defect by changing the threshold can be stored.

When the processing at S804 is completed, the image inspection unit 404 causes the storage unit 407 to store an inspection result (S805). As described above, the inspection result stored in the storage unit 407 at S805 is information about the page determined as the defect or the page determined as the defect candidate. Subsequently, the engine control unit 202 performs engine control such as a reprint request based on the determination result of the image inspection unit 404 using the page defect determination threshold (S806). Through such processing, the operation of inspecting the image according to the embodiment is completed.

FIGS. 12 and 13 are diagrams illustrating the inspection result stored in the storage unit 407 by the image inspection unit 404. FIG. 12 is a diagram illustrating page determination log information indicating the defect determination result for each page, and FIG. 13 is a diagram illustrating defect log information indicating the defect determination result for each pixel group. As illustrated in FIG. 12, in the page determination log information, a "page ID" for identifying each page is associated with "misregistration in X-direction", "misregistration in Y-direction", "number of defect-occurring pixels", "number of defect candidate pixels", and "defect determination result".

Each of the "misregistration in X-direction" and the "misregistration in Y-direction" indicates a misregistration amount between the read image and the master image. Each of the "number of defect-occurring pixels" and the "number of defect candidate pixels" is the number of pixels specified as defect portions in the image for identifying a defect occurring part generated in the area threshold determination. The "number of defect-occurring pixels" is the number of pixels resulting from that the threshold for determining the defect is applied, and the "number of defect candidate pixels" is the number of pixels resulting from that the threshold for determining the defect candidate is applied. The "defect determination result" is a determination result with the page defect determination threshold.

As illustrated in FIG. 13, in the defect log information, a "defect ID" is associated with a "defect type", a "determination result", a "defect range", an "area", and a "defect determination value". The defect log information illustrated in FIG. 13 is generated for each "page ID" in the page determination log information illustrated in FIG. 12.

The "defect ID" is identification information for identifying each pixel group specified as the defect portion in the image for identifying a defect occurring part generated by the area threshold determination. As the "defect ID", for example, used is the label information such as "H001" and "H002" illustrated in FIG. 11 added by a labeling unit 434. The "defect type" is information indicating the type of defect such as the "dot defect", the "line defect", and the "planar defect" as which each pixel group is determined.

The "determination result" is information indicating whether each pixel group is determined by the threshold for determining the defect or by the threshold for determining the defect candidate. The "defect range" is information of coordinates indicating a position of each pixel group in the page. In this information, upper left coordinates of a circumscribed rectangle of the pixel group are indicated by "X1xxx, Y1xxx", and lower right coordinates thereof are indicated by "X2xxx, Y2xxx". The information of "defect range" specifies the defect portion in the read image.

The "area" is the number of pixels included in each pixel group. The "defect determination value" is calculated by the image inspection unit 404 for each pixel group as described above. In the inspection result stored in the storage unit 407, the master image, the read image, and the difference image acquired by the image inspection unit 404 from the difference image generation unit 403 are stored in association with the page ID and a job ID as illustrated in FIG. 14, in addition to the information illustrated in FIGS. 12 and 13.

Next, the following describes the threshold used in the image inspection according to the embodiment. As described above, the image inspection unit 404 uses a plurality of thresholds such as the density difference threshold used for pixel threshold determination, the area threshold used for the area threshold determination, and the page defect determination threshold used for page threshold determination. Accordingly, the thresholds used in the image inspection unit 404 are managed in the threshold information changing unit 406 as the threshold set in which the respective thresholds described above are set.

Figures 14, 15:
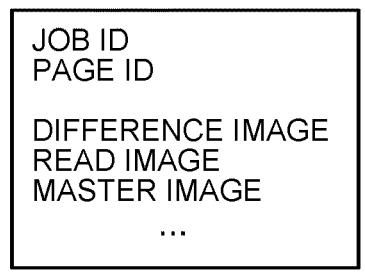
FIG. 14 is a diagram illustrating an example of information stored in a storage unit according to the embodiment.
FIG. 15 is a diagram illustrating an example of a list of threshold sets according to the embodiment.

FIG. 15 is a diagram illustrating a list of the threshold sets managed by the threshold information changing unit 406 according to the embodiment. As illustrated in FIG. 15, a "set ID" for identifying each threshold set, and a "name" and "remarks" for each set are associated with each other in the list of the threshold sets according to the embodiment. As illustrated in FIG. 15, the list of the threshold sets according to the embodiment include set values such as "strict" and "loose" registered to the device in advance, and set values such as a "user setting 1" additionally set by the user.

FIG. 16 is a diagram illustrating content of the threshold included in each threshold set. As illustrated in FIG. 16, the threshold set according to the embodiment includes the density difference threshold and the area threshold for each of the "dot defect", the "line defect", and the "planar defect" such as the "density difference threshold of dot defect" and the "area threshold of line defect". A coefficient used when the image inspection unit 404 calculates a page defect value is also set for each defect type such as a "defect determination coefficient of dot defect".

In addition, as illustrated in FIG. 16, the page defect determination threshold is set to be compared with the defect determination value for each page to perform defect determination for each page by the image inspection unit 404. An "aspect ratio for switching line defect/planar defect" is a threshold of the aspect ratio used to switch a defect group determined as the defect using the threshold for the line defect to the planar defect, or used to switch a defect group determined as the defect using the threshold for the planar defect to the line defect as a result of the area threshold determination.

An "area for switching dot defect/planar defect" is a threshold of the area used to switch a defect group determined as the defect using the threshold for the dot defect to the planar defect, or used to switch a defect group determined as the defect using the threshold for the planar defect to the dot defect as a result of the area threshold determination. As illustrated in FIG. 16, in a "density difference threshold of dot defect candidate", the density difference threshold for determining to store each of the "dot defect", the "line defect", and the "planar defect" as the defect candidate in the storage unit 407, the area threshold, and a coefficient used when the image inspection unit 404 calculates the page defect value are set.

The gist of the embodiment is to facilitate adjustment of each threshold illustrated in FIG. 16 to meet the intension of the user. The following describes a threshold setting operation according to the embodiment. FIG. 17 is a flowchart illustrating the threshold setting operation according to the embodiment. The threshold setting operation according to the embodiment is performed by the image inspecting device 4 communicating with the interface terminal 5.

As illustrated in FIG. 17, first, the image inspection unit 404 receives a condition for selecting a piece of log information to be read from among pieces of defect log information illustrated in FIG. 13 from the interface terminal 5 (S1801). Examples of the selection condition received at S1801 include the number of target pieces of defect log information stored for each pixel group and priority in display as illustrated in FIG. 13. The priority condition includes a condition of giving priority to a new defect, a condition of giving priority to a case in which a difference between a defect pixel area and the area threshold is small, and a condition of giving priority to a defect included in a page in which a difference between the defect determination value for each page and the page defect determination threshold is small. The selection condition received at S1801 may be a condition for selecting the whole defect log information.

In setting the threshold, a defect in which the defect pixel area or the defect determination value for each page is close to the threshold, that is, a defect in which possibility of being determined as the defect is easily changed depending on the setting of the threshold is preferentially presented to the user to enable more precise threshold setting. Accordingly, convenience for the user in selecting the defect can be improved by preferentially displaying the defect pixel group close to the threshold.

When receiving the selection condition for the defect log information from the interface terminal 5 as described above, the image inspection unit 404 reads the defect log information from the storage unit 407 according to the set condition (S1802). The image inspection unit 404 that has read the defect log information meeting the condition generates a partial read image based on the information of "defect range" illustrated in FIG. 13 (S1803). That is, the image inspection unit 404 generates the partial read image of the defect portion on the read image. Specifically, the image inspection unit 404 generates the partial read image of the defect portion indicated by each of the pieces of defect log information that has been read.

At S1803, the image inspection unit 404 extracts a range of a preset size from a target read image centering on a rectangular portion determined as the defect based on the information of "defect range" to generate the partial read image. In this case, upper left coordinates in the extracted range are (PPX, PPY), and the preset size in the X-direction is SPX and the preset size in the Y-direction is SPY.

The image inspection unit 404 that has generated the partial read image generates a defect determination image (an example of an inspection result image) based on the generated partial read image (S1804). At S1804, regarding a part determined as the "defect" based on the information of the "determination result", the image inspection unit 404 surrounds the rectangular portion indicated by the "defect range" with a red frame on the partial read image to generate the defect determination image. Regarding a part determined as the "candidate", the image inspection unit 404 surrounds the rectangular portion indicated by the "defect range" with a blue frame on the partial read image to generate the defect determination image. When the size of the range indicated by the "defect range" is larger than the preset size SPX, SPY, maximum values of the ranges surrounded by the red frame and the blue frame are set to SPX, SPY.

Next, the image inspection unit 404 generates a partial master image (an example of a partial reference image) that is part of the master image corresponding to the partial read image generated at S1803 (S1805). That is, the partial master image is a partial image on the master image corresponding to the defect portion on the read image from which the partial read image is generated. At S1805, the image inspection unit 404 corrects the information of PPX, PPY, SPX, and SPY described above with the information of the "misregistration in X-direction" and the "misregistration in Y-direction" illustrated in FIG. 12 to obtain coordinates of a corresponding portion in the master image, and extracts the corresponding portion from the master image to generate the partial master image.

When the processing up to S1805 is finished, the screen information generation unit 405 generates a defect log list screen as illustrated in FIG. 18 (an example of defect portion selection screen information), and outputs the defect log list screen to be displayed on the interface terminal 5 (S1806). As illustrated in FIG. 18, in the defect log list screen according to the embodiment, displayed are the defect determination image generated at S1804, the "page ID" indicating the page including the defect, and the "job ID" indicating the job including the page, in addition to the information illustrated in FIG. 13. That is, the defect determination images generated by the image inspection unit 404 are arranged in the defect log list screen. A checkbox for selecting the defect to be used in setting the threshold is displayed to indicate being selected. In FIG. 18, the red frame is represented by the dashed line, and the blue frame is represented by the alternate long and short dash line.

When the user operates the interface terminal 5 to check the checkbox of the "select" section illustrated in FIG. 18, selects the defect to be referenced in setting the threshold in the defect log list screen as illustrated in FIG. 18, and presses a button of "adjust inspection threshold", the defect ID of the selected defect is notified to the image inspecting device 4. Accordingly, the image inspection unit 404 receives a defect portion selection input for selecting at least any of one or more defect portions displayed as the defect determination images in the defect log list screen (S1807).

When the image inspection unit 404 receives the defect portion selection input, the screen information generation unit 405 generates and outputs a threshold selection screen (an example of threshold selection screen information) to be displayed on the interface terminal 5 (S1808). The threshold selection screen is a screen in which each of the threshold sets is associated with a threshold-specific defect determination image (an example of a threshold-specific inspection result image) indicating the inspection result based on the threshold set of the partial read image of the defect portion indicated by the selected defect ID.

Figure 19:
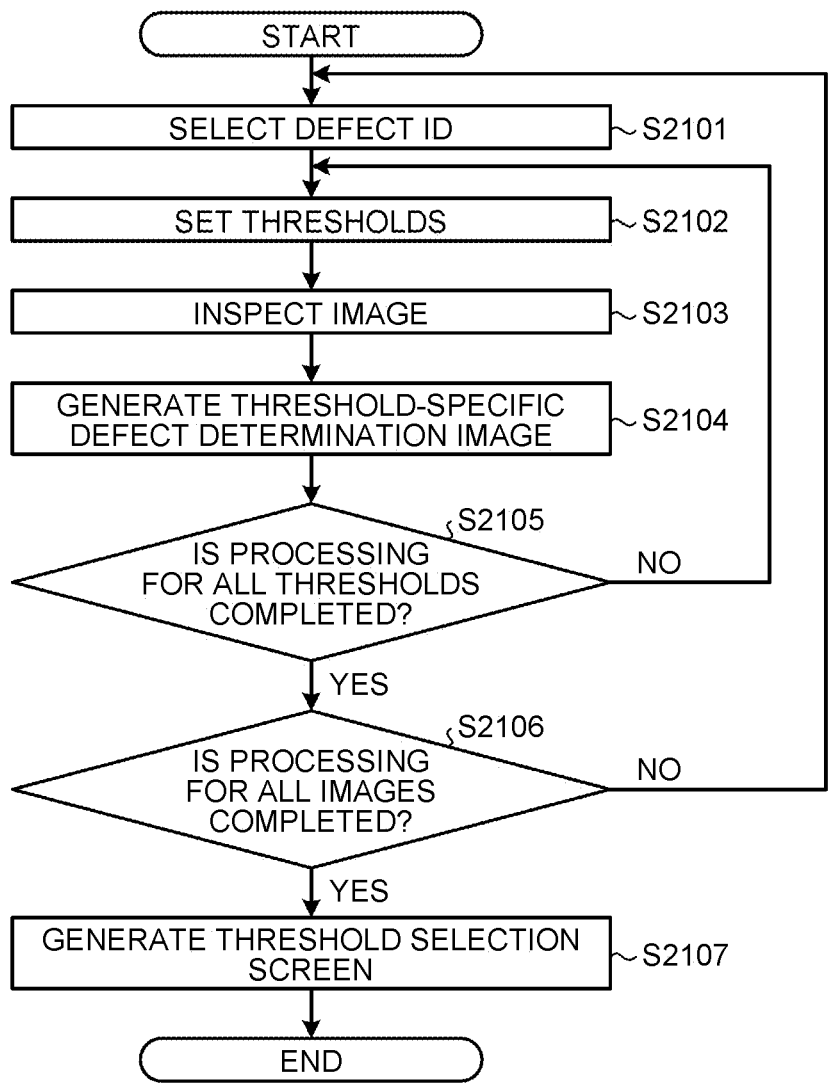
FIG. 19 is a flowchart illustrating a generating operation of a threshold selection screen according to the embodiment.

FIG. 19 is a flowchart illustrating a generating operation of the threshold selection screen at S1808 in FIG. 17. The image inspection unit 404 first selects one of defect IDs selected at S1807 (S2101).

Subsequently, the threshold information changing unit 406 selects one of the threshold sets illustrated in FIG. 15 to perform threshold setting (S2102). The threshold setting at S2102 is a setting of a pixel difference threshold and the area threshold included in the threshold set. When the threshold setting is completed, the image inspection unit 404 inputs, to the difference image generation unit 403, the partial read image of the defect portion of the defect ID selected at S2101 and the partial master image corresponding to the partial read image. Accordingly, the difference image generation unit 403 generates a partial difference image indicating a difference between the partial read image and the partial master image, so that the image inspection unit 404 acquires the partial difference image from the difference image generation unit 403 and inspects the partial read image based on the partial difference image and the threshold set that is set at S2102 (S2103). A method of generating the partial difference image by the difference image generation unit 403 is similar to a method of generating the difference image, and a method of inspecting the partial read image by the image inspection unit 404 is similar to the area threshold determination in a method of inspecting the read image.

In the defect log information stored as illustrated in FIG. 13, a portion determined as the defect or the defect candidate in the inspection is designated as the "defect range". However, this is a determination result obtained with the thresholds used in the inspection. Therefore, a determination result obtained with the threshold set that is set at S2102 does not necessarily indicate the same defect.

An image inspection result at S2103 is a determination result of the area threshold determination. Therefore, the image inspection result at S2103 is a determination result when another threshold set is applied to the defect portion of the read image that is determined as the defect or the defect candidate in the initial inspection. The image inspection unit 404 then generates the threshold-specific defect determination image according to the image inspection result (S2104).

At S2104, when there is a portion determined as the defect in a target partial read image, the image inspection unit 404 surrounds the portion with the red frame to generate the threshold-specific defect determination image. When there is a portion determined as the defect candidate in the target partial read image, the image inspection unit 404 surrounds the portion with the blue frame to generate the threshold-specific defect determination image.

The threshold information changing unit 406, the difference image generation unit 403, and the image inspection unit 404 repeat the processing from S2102 until the processing is finished for all of the threshold sets illustrated in FIG. 15 (No at S2105). That is, the image inspection unit 404 inspects the partial read image based on a corresponding threshold set and the partial difference image for each of the threshold sets.

After completing the processing for all of the threshold sets, the threshold information changing unit 406, the difference image generation unit 403, and the image inspection unit 404 repeat the processing from S2101 until the processing is finished for all of the defect IDs designated at S1807 (No at S2106). That is, when the defect portion selection input is performed, the image inspection unit 404 inspects the partial read image of the defect portion selected by the defect portion selection input based on the threshold information and the partial difference image of the defect portion for each of the threshold sets.

After completing the processing for all of the threshold sets, the screen information generation unit 405 generates the threshold selection screen as illustrated in FIG. 20 using the threshold-specific defect determination image generated through the entire processing (S2107).

FIG. 20 is a diagram illustrating an example of the threshold selection screen according to the embodiment. As illustrated in FIG. 20, the defect image IDs that are re-allocated to the defects that were specified with the defect IDs and selected at S1807, and the threshold sets are displayed in a matrix in the threshold selection screen according to the embodiment.

As illustrated in FIG. 20, the defect image IDs based on the defect IDs selected at S1807 are displayed in the row direction, such as "defect image ID 1", "defect image ID 2", "defect image ID 3", "defect image ID 4", "defect image ID 5" . . . . In the column direction, each threshold set is set in rows lower than the topmost "partial master image". In the threshold-specific defect determination image of "defect image ID 1", "defect image ID 2", "defect image ID 3", "defect image ID 4", or "defect image ID 5" . . . displayed in each row, the red frame or the blue frame indicates the inspection result in a case of being inspected with the threshold set of a corresponding row. An order of the defect image IDs (threshold-specific defect determination images) in the row direction is an ascending order of a difference between the enabled threshold information and the partial difference image of the defect portion indicated by the defect image ID.

That is, in a case of the row of the threshold set "strict", in a cell of the threshold-specific defect determination image determined as the defect using the threshold set "strict", the defect portion of the threshold-specific defect determination image is surrounded by the red frame. In a cell of the threshold-specific defect determination image determined as the defect candidate using the threshold set "strict", the defect portion of the threshold-specific defect determination image is surrounded by the blue frame. Similarly to FIG. 18, the red frame is represented by the dashed line, and the blue frame is represented by the alternate long and short dash line in FIG. 20.

The threshold-specific defect determination image for one cell in the matrix display illustrated in FIG. 20 is generated at S2104. If the processing at S2105 is completed (Yes at S2105), the threshold-specific defect determination images for one column in the matrix display illustrated in FIG. 20 are generated. If the processing at S2106 is completed (Yes at S2106), the threshold-specific defect determination images for all the columns in the matrix display illustrated in FIG. 20 are generated.

As illustrated in FIG. 20, a radio button 20*a* is displayed in the row of each threshold set. When the user operates the interface terminal 5 to check the radio button 20*a* and presses the "adjust inspection threshold" button illustrated in FIG. 20, the screen information generation unit 405 generates a threshold adjustment screen (an example of threshold adjustment screen information) as illustrated in FIG. 21 and outputs the threshold adjustment screen to be displayed on the interface terminal 5. That is, when a threshold information selection input is performed to select any one of the threshold sets, the screen information generation unit 405 generates the threshold adjustment screen.

As illustrated in FIG. 21, in the threshold adjustment screen, the threshold-specific defect determination images of "defect image ID 1", "defect image ID 2", "defect image ID 3", "defect image ID 4", and "defect image ID 5" . . . are displayed. The threshold-specific defect determination images are the threshold-specific defect determination images in the row selected with the radio button 20*a* in the threshold selection screen. As illustrated in FIG. 21, in the threshold adjustment screen, each threshold described with reference to FIG. 16 is displayed such as "density difference threshold of dot defect" and "area difference threshold of dot defect" . . . , and a value of the threshold set corresponding to the row selected with the radio button 20*a* in the threshold selection screen is displayed by default. That is, the threshold adjustment screen information is a screen including a threshold image indicating each value of one or more types of thresholds constituting the threshold set selected by the threshold information selection input, and the threshold-specific inspection result image of the partial read image using the threshold set selected by the threshold information selection input. When the threshold set selected by the threshold information selection input is the threshold set that has been enabled, the threshold adjustment screen information may be a screen including the threshold image indicating each value of one or more types of thresholds constituting the threshold set, and the inspection result image of the partial read image of the defect portion on the read image. In this case, the inspection result image is an inspection result image of the partial read image of the defect portion selected by the defect portion selection input.

The user can adjust a value of each threshold displayed as illustrated in FIG. 21 by operating the interface terminal 5. When the user adjust the value of each threshold by operating the interface terminal 5 and presses a button of "change inspection threshold", the adjusted threshold value and a set ID indicating the threshold set that has been the adjustment target is transmitted as a threshold adjustment command from the interface terminal 5 to the image inspecting device 4. Accordingly, the threshold information changing unit 406 receives an input for adjusting the threshold set (S1809).

After receiving the input for adjusting the threshold set, the threshold information changing unit 406 sets the adjusted threshold set that has been received. The image inspection unit 404 reinspects the partial read image of the defect portion indicated by the defect ID selected at S1807, based on the threshold sets that have been set and the partial difference image of the defect portion. Specifically, the image inspection unit 404 performs the operation illustrated in FIG. 19 again with respect to the threshold sets that have been set and the partial read image of the defect portion indicated by the defect ID selected at S1807 (S1810). Accordingly, the image inspection is performed again with respect to the partial read images of "defect image ID 1", "defect image ID 2", "defect image ID 3", "defect image ID 4", and "defect image ID 5" . . . illustrated in FIG. 21, and a reinspected defect determination image (an example of a reinspection result image), which is the threshold-specific defect determination image obtained by reinspection, is generated (S1811).

When reinspected defect determination images are generated, to update the threshold-specific defect determination images of "defect image ID 1", "defect image ID 2", "defect image ID 3", "defect image ID 4", and "defect image ID 5" . . . illustrated in FIG. 21, the screen information generation unit 405 generates and outputs a threshold adjustment result screen (an example of threshold adjustment result screen information) to be displayed on the interface terminal 5. Accordingly, the interface terminal 5 updates the threshold adjustment screen illustrated in FIG. 21 to the threshold adjustment result screen (S1812). The threshold adjustment result screen is a screen including the threshold image indicating each value of one or more types of thresholds constituting the adjusted threshold set and the reinspection result image of the partial read image using the adjusted threshold set. Due to this, the user can recognize in real time how an image inspection result is changed by adjusting of the threshold.

When the "change inspection threshold" button illustrated in FIG. 21 is pressed in a state in which the threshold is adjusted as intended by the user through the processing as described above, the interface terminal 5 transmits, to the image inspecting device 4, a threshold information change input for changing the threshold set selected with the radio button illustrated in FIG. 20 to the adjusted threshold set. Accordingly, the threshold information changing unit 406 receives the threshold information change input (S1813). The threshold information change input includes the set ID of the threshold set the threshold setting of which should be changed, and a changed threshold.

After receiving the threshold information change input, the threshold information changing unit 406 overwrites a threshold value according to the set ID designated in the threshold information change input with the changed threshold included in the threshold information change input to change the threshold set to the adjusted threshold set to be recorded (S1814). The display of the interface terminal 5 is then returned to the threshold selection screen illustrated in FIG. 20. The threshold-specific defect determination images of "defect image ID 1", "defect image ID 2", "defect image ID 3", "defect image ID 4", and "defect image ID 5" . . . for the threshold set selected with the radio button in the threshold selection screen are updated to the reinspected defect determination images generated at S1811.

When a button of "select inspection threshold" illustrated in FIG. 20 is pressed in a state in which the radio button of any threshold set is selected in the threshold selection screen illustrated in FIG. 20, the interface terminal 5 transmits, to the image inspecting device 4, a threshold selection command to select the threshold set of the selected radio button as a threshold to be used in subsequent inspection. Accordingly, the threshold information changing unit 406 receives the threshold selection command (S1815). The threshold selection command includes the set ID of the threshold set to be selected as the threshold to be used in the subsequent inspection.

After receiving the threshold selection command, the threshold information changing unit 406 stores the threshold selection so that the threshold set according to the set ID designated in the threshold selection command is used in the subsequent inspection (S1816). Accordingly, when the operation illustrated in FIG. 7 is performed thereafter, used is the threshold in the threshold set according to the set ID designated in the threshold selection command received at S1815. With such an operation, the threshold setting operation according to the embodiment is completed.

As described above, the image inspecting device 4 according to the embodiment stores information indicating a portion determined as a defect in the inspection of the read image, and the threshold selection screen displays the portion determined as the defect as illustrated in FIG. 20. When the input for adjusting the threshold set is received, a determination result with the adjusted threshold is generated and displayed. With this configuration, the user can easily understand what defect the determination result of which is changed by adjusting the threshold is, so that the threshold used for inspecting the image can be easily changed to a value intended by the user.

In the image inspecting device 4 according to the embodiment, a plurality of portions determined as defects are displayed as illustrated in FIG. 20, and determination results for the respective portions are displayed based on the same threshold setting. Accordingly, the user can more easily understand what defect the determination result of which is changed by setting a certain threshold is.

As illustrated in FIG. 20, the image inspecting device 4 according to the embodiment displays a determination result of the defect when a plurality of different threshold settings are applied to the portion determined as the defect. Accordingly, the user can easily understand how the difference between the images is determined as the defect depending on various threshold settings.

As illustrated in FIG. 18, in the image inspecting device 4 according to the embodiment, an image in which a defect pixel area or the defect determination value for each page is closer to the threshold is displayed in a higher position. Accordingly, it is possible to case the user to select an image the determination result of which is easily changed by adjusting the threshold, and a more precise threshold setting can be achieved.

As illustrated in FIG. 21, the above embodiment describes an example of adjusting the density difference threshold and the area difference threshold. However, this is merely an example. As illustrated in FIG. 16, all of the thresholds included in the threshold set can be selected to be adjusted. On the other hand, as illustrated in FIG. 20, the image inspecting device 4 according to the embodiment extracts the portion determined as the defect to present it to the user, which is especially effective in adjusting the density difference threshold and the area difference threshold related to defect determination of each portion.

As described above, the screens as illustrated in FIGS. 18, 20, and 21 are displayed on the interface terminal 5. This display is implemented with a dedicated application installed on the interface terminal 5 in advance, for example. Alternatively, for example, information for HTML format display or the like may be generated by the image inspecting device 4 and transmitted to the interface terminal 5, and the screens as illustrated in FIGS. 18, 20, and 21 may be displayed via a general application such as an Internet browser installed on the interface terminal 5.

In any case, the image inspection unit 404 generates information based on the read image and master image stored in the storage unit 407 and the information as illustrated in FIGS. 12 and 13 to implement the screen display as illustrated in FIGS. 18, 20, and 21, which can facilitate the threshold setting intended by the user.

As illustrated in FIG. 3, the embodiment describes an example in which the image inspecting device 4 acquires the bit map data from the engine controller 2 to generate the master image. However, this is merely an example. That is, not only in the case of variable data printing, when the embodiment is applied as a method of threshold setting in inspecting the read image by comparing the read image and the master image, an effect can be obtained such that the threshold setting intended by the user can be facilitated as described above.

According to an embodiment, the threshold used for inspecting the image can be easily changed to a value intended by the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image inspecting device comprising:
   a read image acquisition unit configured to acquire a read image obtained by reading an image formed by an image formation output;
   a reference image generation unit configured to generate a reference image based on print data, the print data being a generation source of the image formed by the image formation output;
   an image inspection unit configured to inspect the read image based on threshold information including one or more types of thresholds and a difference image indicating a difference between the read image and the reference image, and specifies a defect portion on the read image; and
   a screen information generation unit configured to generate and output threshold adjustment screen information including a threshold image indicating each value of the one or more types of thresholds constituting the threshold information and an inspection result image indicating an inspection result of a partial read image of the defect portion on the read image, wherein
   when an adjustment input of the threshold information is performed for adjusting at least one value of the one or more types of thresholds, the image inspection unit reinspects the partial read image based on adjusted threshold information and a partial difference image indicating a difference between a partial read image of the defect portion on the read image and a partial reference image of a portion corresponding to the defect portion on the reference image,
   the screen information generation unit generates and outputs threshold adjustment result screen information including a threshold image indicating each value of the one or more types of thresholds constituting the adjusted threshold information and a reinspection result image indicating a reinspection result of the partial read image using the adjusted threshold information, and
   the image inspecting device further comprises a threshold information changing unit configured to change the threshold information to the adjusted threshold information based on a threshold information change input for changing the threshold information to the adjusted threshold information.

2. The image inspecting device according to claim 1, wherein
   the image inspection unit specifies one or more defect portions on the read image, and
   the threshold adjustment screen information includes an inspection result image of a partial read image of a defect portion selected by a defect portion selection input for selecting at least one of the one or more defect portions.

3. The image inspecting device according to claim 2, wherein
   the threshold information is a piece of threshold information for which an enabling value has been set, among a plurality of pieces of threshold information,
   the screen information generation unit generates and outputs defect portion selection screen information in which inspection result images of partial read images of the one or more defect portions are arranged,
   when the defect portion selection input is performed, the image inspection unit inspects a partial read image of a defect portion selected by the defect portion selection input based on the threshold information and a partial difference image of the defect portion for each of the pieces of threshold information,
   the screen information generation unit generates and outputs threshold selection screen information in which each of the pieces of threshold information is associated with a threshold-specific inspection result image indicating an inspection result of the partial read image based on a corresponding piece of threshold information, and
   when a threshold information selection input is performed for selecting any of the pieces of threshold information, the screen information generation unit generates, as the threshold adjustment screen information, a screen including a threshold image indicating each value of the one or more types of thresholds constituting the threshold information selected by the threshold information selection input and a threshold-specific inspection result image of the partial read image using the threshold information selected by the threshold information selection input.

4. The image inspecting device according to claim 3, wherein, in the threshold selection screen information, the threshold-specific inspection result images are arranged in an ascending order of a difference between the partial difference image and the enabled threshold information.

5. The image inspecting device according to claim 1, wherein
   the threshold information includes a density difference threshold as a threshold of a density difference with respect to a pixel and an area threshold as a threshold of number of pixels with respect to a pixel group including pixels exceeding the density difference threshold, and
   values of the density difference threshold and the area threshold are different for each of the pieces of threshold information.

6. The image inspecting device according to claim 5, wherein the image inspection unit compares a pixel value of each pixel constituting the difference image with the density difference threshold, compares the area threshold with number of pixels in a pixel group including pixels having pixel values exceeding the density difference threshold and closer to each other than a certain interval, and specifies the pixel group as a defect portion when the number of pixels exceeds the area threshold.

7. The image inspecting device according to claim 5, wherein the image inspection unit compares a pixel value of each pixel constituting the partial difference image with the density difference threshold, compares the area threshold with number of pixels in a pixel group including pixels having pixel values exceeding the density difference threshold and closer to each other than a certain interval, and specifies the pixel group as a defect portion when the number of pixels exceeds the area threshold.

8. An image forming system comprising:
an image forming unit configured to output an image formation on a recording medium;
an image reading unit configured to generate a read image by reading an image formed on the recording medium;
a read image acquisition unit configured to acquire the read image;
a reference image generation unit configured to generate a reference image based on print data, the print data being a generation source of the image formed on the recording medium;
an image inspection unit configured to inspect the read image based on threshold information including one or more types of thresholds and a difference image indicating a difference between the read image and the reference image to specify a defect portion on the read image; and
a screen information generation unit configured to generate and output threshold adjustment screen information including a threshold image indicating each value of the one or more types of thresholds constituting the threshold information and an inspection result image indicating an inspection result of a partial read image of the defect portion on the read image, wherein
when an adjustment input of the threshold information is performed for adjusting at least one of the one or more types of thresholds, the image inspection unit reinspects the partial read image based on adjusted threshold information and a partial difference image indicating a difference between a partial read image of the defect portion on the read image and a partial reference image of a portion corresponding to the defect portion on the reference image,
the screen information generation unit generates and outputs threshold adjustment result screen information including a threshold image indicating each value of the one or more types of thresholds constituting the adjusted threshold information and a reinspection result image indicating a reinspection result of the partial read image using the adjusted threshold information, and
the image forming system further comprises a threshold information changing unit configured to change the threshold information to the adjusted threshold information based on a threshold information change input for changing the threshold information to the adjusted threshold information.

9. A computer program product comprising a non-transitory computer-readable medium containing an information processing program, the program causing a computer to perform:
acquiring a read image obtained by reading an image formed by an image formation output;
generating a reference image based on print data, the print data being a generation source of the image formed by the image formation output;
inspecting the read image based on threshold information including one or more types of thresholds and a difference image indicating a difference between the read image and the reference image, to specify a defect portion on the read image;
generating and outputting threshold adjustment screen information including a threshold image indicating each value of the one or more types of thresholds constituting the threshold information and an inspection result image indicating an inspection result of a partial read image of the defect portion on the read image;
when an adjustment input of the threshold information is performed for adjusting at least one value of the one or more types of thresholds, reinspecting the partial read image based on adjusted threshold information and a partial difference image indicating a difference between a partial read image of the defect portion on the read image and a partial reference image of a portion corresponding to the defect portion on the reference image;
generating and outputting threshold adjustment result screen information including a threshold image indicating each value of the one or more types of thresholds constituting the adjusted threshold information and a reinspection result image indicating a reinspection result of the partial read image using the adjusted threshold information; and
changing the threshold information to the adjusted threshold information based on a threshold information change input for changing the threshold information to the adjusted threshold information.

* * * * *